(12) United States Patent
Morimoto et al.

(10) Patent No.: US 8,799,317 B2
(45) Date of Patent: Aug. 5, 2014

(54) FORENSIC SYSTEM, FORENSIC METHOD, AND FORENSIC PROGRAM

(75) Inventors: Masahiro Morimoto, Tokyo (JP); Yoshikatsu Shirai, Tokyo (JP); Hideki Takeda, Tokyo (JP)

(73) Assignee: UBIC, Inc. (JP)

( * ) Notice: Subject to any disclaimer, the term of this patent is extended or adjusted under 35 U.S.C. 154(b) by 0 days.

(21) Appl. No.: 13/514,966

(22) PCT Filed: Mar. 24, 2011

(86) PCT No.: PCT/JP2011/057141
§ 371 (c)(1),
(2), (4) Date: Jun. 8, 2012

(87) PCT Pub. No.: WO2011/122431
PCT Pub. Date: Oct. 6, 2011

(65) Prior Publication Data
US 2012/0246185 A1    Sep. 27, 2012

(30) Foreign Application Priority Data
Mar. 29, 2010 (JP) .................................. 2010-075960

(51) Int. Cl.
*G06F 17/00* (2006.01)
*G06F 17/30* (2006.01)
*G06Q 50/18* (2012.01)

(52) U.S. Cl.
CPC .......... *G06Q 50/18* (2013.01); *G06F 17/30011* (2013.01)
USPC ...................................................... 707/780

(58) Field of Classification Search
CPC .................................................. G06Q 50/18
USPC .................................................. 707/603, 776
See application file for complete search history.

(56) References Cited

U.S. PATENT DOCUMENTS

| | | | |
|---|---|---|---|
| 5,903,646 A * | 5/1999 | Rackman | 705/51 |
| 6,493,706 B1 | 12/2002 | Mead et al. | |
| 7,043,489 B1 * | 5/2006 | Kelley | 1/1 |
| 7,197,716 B2 * | 3/2007 | Newell et al. | 715/760 |

(Continued)

FOREIGN PATENT DOCUMENTS

| | | |
|---|---|---|
| CN | 1934567 A | 3/2007 |
| CN | 1965313 A | 5/2007 |

(Continued)

OTHER PUBLICATIONS

V. Aleven, "Using background knowledge in case-based legal reasoning: A computational model an and intelligent learnin envronment", Elsevier, 2003, pp. 183-237.*

(Continued)

*Primary Examiner* — Polina Peach

(57) ABSTRACT

Embodiments of the inventive concept can extract digital document information related with a specific individual to achieve a work load reduction associated with evidentiary material preparation for litigation. A specific individual is selected from at least one individual included in user information. Only digital document information which was accessed by the specific individual is extracted based on access history information regarding the selected specific individual. Additional information indicating whether or not document files in the extracted digital document information are each related with the litigation is set, and a document file related with the litigation is outputted based on the additional information.

18 Claims, 4 Drawing Sheets

(56) References Cited

U.S. PATENT DOCUMENTS

| | | | |
|---|---|---|---|
| 7,617,251 B2* | 11/2009 | Blumenau et al. | 1/1 |
| 7,693,866 B1* | 4/2010 | Weaver et al. | 707/999.107 |
| 7,716,196 B2 | 5/2010 | Ghielmetti et al. | |
| 7,761,427 B2* | 7/2010 | Martin et al. | 707/661 |
| 7,865,450 B2* | 1/2011 | Opsitnick et al. | 705/311 |
| 7,890,493 B2 | 2/2011 | Chen | |
| 7,941,412 B2* | 5/2011 | Dunne et al. | 707/694 |
| 8,001,129 B2 | 8/2011 | Arumainayagam et al. | |
| 8,090,705 B1* | 1/2012 | Panse | 707/708 |
| 8,126,886 B2* | 2/2012 | Fenne et al. | 707/728 |
| 8,171,041 B2 | 5/2012 | Bennett | |
| 8,214,391 B2* | 7/2012 | Denesuk et al. | 707/776 |
| 8,396,838 B2* | 3/2013 | Brockway et al. | 707/662 |
| 8,412,628 B2* | 4/2013 | Beach et al. | 705/40 |
| 2001/0027451 A1 | 10/2001 | Taguchi et al. | |
| 2002/0138250 A1 | 9/2002 | Okura et al. | |
| 2003/0182310 A1 | 9/2003 | Charnock et al. | |
| 2004/0006594 A1* | 1/2004 | Boyer et al. | 709/204 |
| 2005/0027750 A1 | 2/2005 | Martin et al. | |
| 2005/0086179 A1* | 4/2005 | Mehmet | 705/80 |
| 2005/0203899 A1 | 9/2005 | Anderson et al. | |
| 2005/0240578 A1* | 10/2005 | Biederman et al. | 707/3 |
| 2006/0004702 A1 | 1/2006 | St. John et al. | |
| 2006/0069685 A1* | 3/2006 | Dickens et al. | 707/10 |
| 2006/0129445 A1* | 6/2006 | McCallum | 705/8 |
| 2006/0143155 A1 | 6/2006 | Kagimasa et al. | |
| 2007/0130100 A1* | 6/2007 | Miller | 707/1 |
| 2007/0150259 A1 | 6/2007 | Akahane et al. | |
| 2008/0208838 A1* | 8/2008 | Friedlander et al. | 707/5 |
| 2008/0222108 A1 | 9/2008 | Prahlad et al. | |
| 2009/0150168 A1* | 6/2009 | Schmidt | 705/1 |
| 2009/0165026 A1* | 6/2009 | Paknad et al. | 719/328 |
| 2009/0217360 A1 | 8/2009 | Tsuchiya et al. | |
| 2009/0276406 A1* | 11/2009 | Kelley | 707/3 |
| 2009/0288164 A1 | 11/2009 | Adelstein et al. | |
| 2009/0292743 A1* | 11/2009 | Bigus et al. | 707/202 |
| 2009/0326917 A1 | 12/2009 | Hegenberger | |
| 2010/0150453 A1 | 6/2010 | Ravid et al. | |
| 2010/0250531 A1* | 9/2010 | Andersen et al. | 707/736 |
| 2010/0250573 A1* | 9/2010 | Mayer et al. | 707/759 |
| 2011/0098999 A1 | 4/2011 | Amini et al. | |
| 2011/0286584 A1 | 11/2011 | Angel et al. | |

FOREIGN PATENT DOCUMENTS

| | | |
|---|---|---|
| CN | 101546364 A | 9/2009 |
| JP | 06044325 | 2/1994 |
| JP | 11272671 | 10/1999 |
| JP | 2001222477 A | 8/2001 |
| JP | 2003288365 A | 10/2003 |
| JP | 2003345798 A | 12/2003 |
| JP | 2006-178521 | 7/2006 |
| JP | 2007-148731 | 6/2007 |
| JP | 2007-172221 | 7/2007 |
| JP | 2007-334412 | 12/2007 |
| JP | 2008-097484 | 4/2008 |
| JP | 2009-015659 | 1/2009 |
| JP | 2009-205220 | 9/2009 |
| JP | 2009276862 A | 11/2009 |
| JP | 2009294896 A | 12/2009 |
| WO | 2007044709 | 4/2007 |
| WO | 2007067424 A | 6/2007 |

OTHER PUBLICATIONS

A.P. Dawid, "Baye's Theorem and weighing evidence by juries" University College London, 2001, pp. 1-18.*

Huygen, "Use of Bayesian Belief Networks in legal reasoning", 17th BILETA Anual Conference, 2002, 14 pages.*

International Search Report dated Apr. 11, 2011 corresponding to International Patent Application No. PCT/JP2011/057141.

Written Opinion dated Apr. 11, 2011 corresponding to International Patent Application No. PCT/JP2011/057141.

Final Office Action for U.S. Appl. No. 13/514,295, mailed Jan. 9, 2013.

Final Office Action for U.S. Appl. No. 13/514,981, mailed Mar. 14, 2013.

International Search Report dated Apr. 19, 2011 corresponding to International Application No. PCT/JP2011/057142.

International Search Report dated Oct. 4, 2011 corresponding to PCT/JP2011/067055.

JP 11-272671 Shimazu Miwako and Yoshimura Yumiko Machine Translation of the applicant's IDS.

Juan Jose Garda Adeva et al. "Multilingual Approaches to Text Categorisation", 2006, University of Sydney.

Li et al. "Advanced teaming algorithms for cross-language patent retrieval and classification", Apr. 27, 2007, Information Processing & Management, Elsevier, Barking, G8, vol. 43, pp. 1183-1199.

Notice of Allowance for U.S. Appl. No. 13/514,981, mailed Jul. 15, 2013.

Office Action for U.S. Appl. No. 13/514,295, mailed May 7, 2013.
Office Action for U.S. Appl. No. 13/514,295, mailed Sep. 18, 2012.
Office Action for U.S. Appl. No. 13/514,981, mailed Nov. 28, 2012.

Rigutini et al. "An EM based training algorithm for Cross-Language Text Categorization", 2005, IEEE, pp. 529-535.

Written Opinion dated Apr. 11, 2011 corresponding to International Application No. PCT/JP2011/057142.

Written Opinion dated Oct. 10, 2011 corresponding to PCT/JP2011/067055.

Morimoto Masahiro, Computer & Network LAN, (http://www.ohmsha.co.jp/), Mar. 2005.

Extended European Search Report for EP11762662.2, mailed Sep. 6, 2013.

Extended European Search Report for EP11762663.0, mailed Aug. 27, 2013.

Takahashi et al., "Complexity Analysis of Retrieving Knowledge from Auditing Log Files for Computer and Network Forensics and Accountability," IEEE International Conference on Communications, 2008: ICC '08 ; May 19-23, 2008, Beijing, China, IEEE, Piscataway, NJ, USA, May 19, 2008 (May 19, 2008), pp. 1474-1478.

Notice of Allowance for U.S. Appl. No. 13/514,295, mailed Oct. 29, 2013.

* cited by examiner

FORENSIC SYSTEM, FORENSIC METHOD, AND FORENSIC PROGRAM

CROSS-REFERENCE TO RELATED APPLICATION

This application is a U.S. National Phase Application of PCT International Application PCT/JP2011/057141, filed Mar. 24, 2011, which claims priority to Japanese Patent Application No. 2010-075960, filed on Mar. 29, 2010, the disclosure of which is incorporated herein by reference in its entirety.

BACKGROUND

1. Technical Field

Embodiments of the inventive concept relate to a forensic system, method, and program, and in particular, to a forensic system, method, and program for collecting digital document information relating to litigation.

2. Background Art

Conventionally, when a crime or a legal conflict relating to a computer such as unauthorized access or leakage of confidential information or other so-called "forensic" events occur, a means or a technique for collecting and analyzing devices, data, or electronic records required for investigation into the cause of or to otherwise clarify legal evidences thereof have been proposed.

Particularly, in civil litigation in United State of America, since such a procedure as eDiscovery is required, both a plaintiff and a defendant involved in the litigation must submit all related digital information as evidences. They also need to submit digital information recorded in computers and/or servers as evidentiary material as well.

Due to the rapid development and spreading of information technologies, most information that is being produced in today's world is being produced or otherwise replicated by computers, such that massive amounts of digital information are generated, even within the same company.

Therefore, in the preparation work of gathering evidentiary material for submission to a court of law or other party, mistakes can occur where even confidential digital information, which is not necessarily related with the litigation, is nevertheless inadvertently submitted together with the evidentiary materials, which can cause legal waiver issues and other problems.

In recent years, techniques related to forensic systems have been proposed in JP-A-2006-178521 and JP-A-2007-148731. JP-A-2006-178521 discloses a forensic system where identification of a wrongdoer can be performed efficiently by a method which allows testimony to evidentiary conservation, whereby reliability of the identification is robust against human factors.

JP-A-2007-148731 discloses a forensic system where a forensic related system performs an ex-post handling, such as identification of a criminal, in connection with a legal action or determination such as an amount of loss compensation in an information damage insurance system, which pays insurance coverage due to leakage of personal information.

However, the conventional forensic systems of JP-A-2006-178521 and JP-A-2007-148731 disclose that in the collection of digital document information related with a specific individual, they may specify accessible digital document information by the individual to collect all the information. However, due to the broader access right, a vast amount of information is eventually collected.

Further, when all the information set with an access right to the individual is collected, if the individual's position is higher within an organization, the access right tends to be set broader, so that an enormous amount of electronic documents, which are not related with the litigation and which were not actually browsed by the individual are eventually collected.

As a result, too much work and cost are required for analyzing and evaluating documents to find only the documents that are related with the individual from the vast amounts of collected information.

SUMMARY

The inventive concept provides a forensic system, method and program for analyzing digital information which was accessed by an individual related with litigation without analyzing all of the digital information to which the individual may have an access right.

In an aspect of the inventive concept, there is provided a forensic system which acquires digital information recorded on a plurality of computers or a server to analyze the acquired digital information. The forensic system may comprise: a digital information acquiring unit configured to acquire digital information containing digital document information composed of a plurality of document files, to acquire user information about users using the plurality of computers or the server, and to acquire access history information which shows a fact that the users accessed a document file recorded in the server; a recording unit configured to record therein digital information acquired by the digital information acquiring unit; a display unit configured to display the recorded digital information; a specific-individual selecting unit configured to select, via the display unit, a specific individual from at least one user contained in the user information; a digital document information extracting unit configured to extract only digital document information which was accessed by the specific individual based on the access history information related with the selected specific individual; an additional information setting unit configured to set, via the display unit, additional information indicating whether or not document files in the extracted digital document information are each related with litigation; and an output unit configured to output a document file related with the litigation based on the additional information.

The term "access history information" means information showing that a user which uses any of a plurality of computers accessed the digital document information recorded in the server. For example, access history information may include a user ID indicating who the user is, and access information indicating when and which digital document information the user has accessed.

The term "digital information acquiring unit" means a unit which may acquire digital information recorded in a plurality of computers or servers. For example, a method for acquiring the digital information may include a method for copying digital information recorded in the computers or the server in an electronic medium to copy the digital information in a forensic system via the electronic medium, and/or a method for connecting the computers or the server and the forensic system to each other via a network line to copy digital information recorded in the computers or the server in the forensic system, thereby performing preservation of digital information. Moreover, the digital information acquiring unit may include a unit to acquire second digital information including second digital document information, second user information, and second access history information, the second digital information being recorded in a second server which is different from the above-described server. The forensic system of the inventive concept may be a system which can use not only the above-described digital information but also the second digital information to extract the second digital document information based on the second access history information.

In one aspect of the inventive concept, the forensic system may further comprise a text information extracting unit configured to extract text information for each of the plurality of document files from the recorded digital document information; a keyword selecting unit configured to select a keyword; and a searching unit configured to search a document file including the selected keyword based on the extracted text information, wherein the additional information setting unit is configured to set additional information to the searched document file.

In one aspect of the inventive concept, the forensic system may further comprise a data converting unit configured to convert recorded document files in the digital document information in the recording unit into a predetermined data format, wherein the document files converted by the data converting unit are processed with the same data format as the converted data format in a period before it is outputted by the output unit.

In another aspect of the inventive concept, the forensic system may further comprise a statistical data producing unit configured to produce statistical data represented by data size for each data format of the acquired digital document information, or statistical data represented by data size for each data format of the searched digital document information.

Further, the forensic system of the inventive concept can comprise a clock unit which, when digital information is newly acquired, is configured to clock a time and date of the acquisition of the digital information, the digital information further including folder information saving the digital document information, wherein the digital information acquiring unit is configured to acquire the digital document information and the folder information which were produced after a time and date previously clocked by the clock unit, and is configured to acquire user information and access history information related with the acquired digital document information and folder information.

The term "server" may mean one or more servers, or a combination of a plurality of servers. Further, for example, the server may include at least two of a mail server, a file server, and a document managing server.

The configuration of the forensic system may include a plurality of servers, where the digital information extracting unit and the searching unit are separated to the various servers, respectively, and the separate servers of the forensic system are further connected to each other via a network.

The forensic system of the inventive concept can be provided with a plurality of additional information setting units where additional information can be set by different operators.

The term "display unit" may mean a display device to display digital information. Further, the term "displays the recorded digital information" may mean displaying all of the user information, the digital document information, and the access history information, displaying at least one of these, or displaying at least one attribute (e.g., names of users, names of document files, individuals which conducted access, access time, and/or document files).

The term "output unit" may mean any suitable unit to output or otherwise produce digital document information.

For example, the output unit may be a printer or a device to produce a digital document file.

In another aspect of the inventive concept, there is provided a forensic method for acquiring digital information recorded on a plurality of computers or a server to analyze the acquired digital information. The method may comprise: acquiring digital information containing digital document information composed of a plurality of document files, acquiring user information about users using the plurality of computers or the server, and acquiring access history information which shows a fact that the users accessed a document file recorded in the server; recording the acquired digital information; displaying the recorded digital information; selecting a specific individual from at least one user contained in the user information; extracting only digital document information which was accessed by the specific individual based on the access history information related with the selected specific individual; setting additional information indicating whether or not document files in the extracted digital document information are each related with litigation; and outputting a document file related with the litigation based on the additional information.

In one aspect of the inventive concept, there is provided a non-transitory forensic program for acquiring digital information recorded on a plurality of computers or a server to analyze the acquired digital information, for causing a computer to execute: a function of acquiring digital information containing digital document information composed of a plurality of document files, acquiring user information about users using the plurality of computers or the server, and acquiring access history information which shows a fact that the users accessed a document file recorded in the server; a function of recording the acquired digital information; a function of displaying the recorded digital information; a function of selecting a specific individual from at least one user contained in the user information; a function of extracting only digital document information which was accessed by the specific individual based on the access history information related with the selected specific individual; a function of setting additional information indicating whether or not document files in the extracted digital document information are each related with litigation; and a function of outputting a document file related with the litigation based on the additional information.

The above-described summary of the inventive concept does not necessarily include all of features or combinations of the inventive concept. Further, sub-combinations of these features may constitute additional embodiments of the inventive concept.

According to the forensic system, method, and program of the inventive concept, by selecting a specific individual, extracting only digital document information which was accessed by the specific individual based on access history information about the selected specific individual, setting additional information indicating whether or not document files in the extracted digital document information are each related with litigation, and outputting a document file related with the litigation based on the additional information, the operators can extract only the digital document information which was accessed by the specific individual and analyze and evaluate the same without evaluating all of the digital document information within a range of an accessible right possessed by the specific individual who is related with the litigation.

The present system may extract only the digital document information related with the specific individual among the flood of digital document information, thereby achieving word load reduction for evidentiary material preparation associated with the litigation.

According to the present forensic system, method, and program of the inventive concept, the second digital information recorded in the second server can be used, so that when the second digital document information is extracted based on the second access history information, the operators can extract only digital document information which was accessed by the specific individual from digital document information recorded in the second server, and analyze and evaluate the same without evaluating all of the digital information recorded in a plurality of servers.

According to the present forensic system, the method, and program of the inventive concept, the text information extracting unit, the keyword selecting unit, and the searching unit are further provided, where, when the additional information setting unit sets additional information to the searched document file, the operator(s) can narrow down only some of the digital document information recorded in the server which was accessed by the specific individual, and a population of digital document information which is potentially related with the litigation, using a predetermined search.

According to the present forensic system, method, and program of the inventive concept, when a document file converted by the data converting unit is processed with the same data format as the converted data format in a period before it is outputted by the output unit, the operator(s) can reduce a wasteful step such as data format conversion in the course of a processing flow, and they can exclude a risk of quality degradation of the digital document information.

Further, according to the forensic system, method, and program of the inventive concept, when the statistical data producing unit is provided, since statistical data can be visualized and provided to the operator(s), the operator(s) can grasp the labor required for litigation preparation in an early stage.

Further, according to the forensic system, method, and program of the inventive concept, when the digital information acquiring unit acquires digital document information and folder information which were produced after a time and date previously clocked by the clock unit, and it acquires user information and access history information related with the acquired digital document information and folder information, the operator(s) can perform difference collection of digital information, which can reduce the load for acquiring the same digital information from such a device as the server redundantly each time.

According to the forensic system, method, and program of the inventive concept, when the digital information extracting unit and the searching unit are separated into various servers of a forensic system, respectively, the processing capacity of the whole system can be improved by distributing calculation steps of respective processing units to the respective servers.

The forensic system, method, and program may further include a plurality of additional information setting units. The additional information setting units may set additional information by different operators, thereby enabling a plurality of individuals to evaluate digital document information as a preparatory work for submitting evidentiary material to a court of law at an early stage.

DETAILED DESCRIPTION

Embodiments of the inventive concept will be described below with reference to the drawings.

Figure 1:
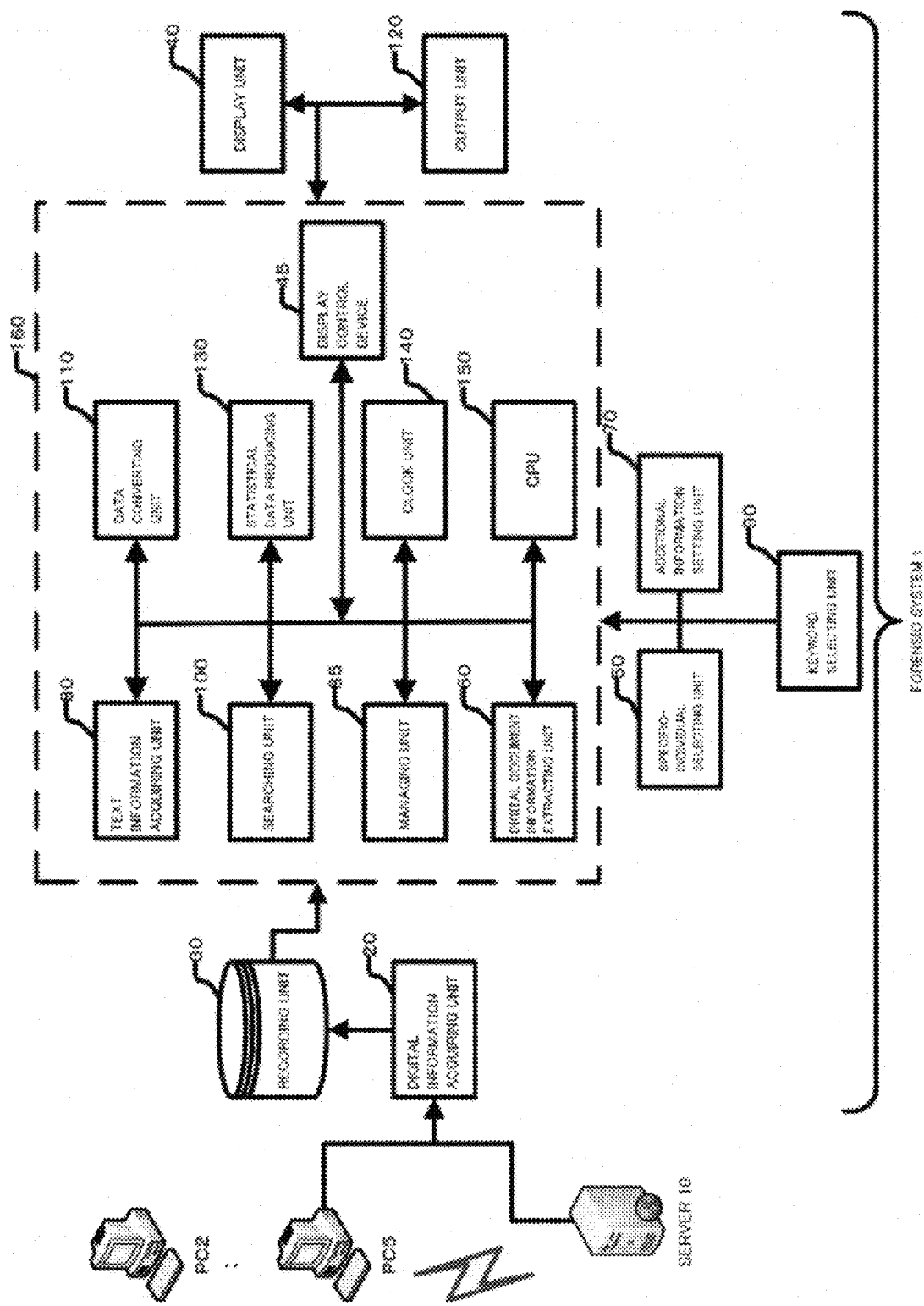
FIG. 1 is a block diagram showing a forensic system in a first embodiment of the inventive concept.

FIG. 1 is a block diagram showing a forensic system 1 in an embodiment of the inventive concept. The forensic system 1 shown in FIG. 1 may acquire digital information recorded in a plurality of computers (PC2 to PC5) and server 10 to analyze the acquired digital information. The forensic system 1 is provided with digital information acquiring unit 20. The digital information acquiring unit 20 may acquire digital information 25 including digital document information composed of a plurality of document files 27 and/or user information 29 about users using the plurality of computers (PC2 to PC5) or server 10. The digital information acquiring unit 20 may also acquire access history information 28 showing the fact that the users accessed document files (e.g., 27) recorded in the server 10. The recording unit 30 may record the digital information (e.g., 25) acquired by the digital information acquiring unit 20. The display unit 40 may display the recorded digital information. The specific-individual selecting unit 50 may select, via the display unit 40, a specific individual from users contained in the user information 29. The digital document information extracting unit 60 may extract only digital document information which was accessed by the specific individual based on access history information related with the selected specific individual. An additional information setting unit 70 may set, via the display unit 40, additional information showing whether or not document files in the extracted digital document information are each related with litigation. The output unit 120 may output a document file related with the litigation based on the additional information.

The control unit 160 may include the display control device 45, digital document information extracting unit 60, text information acquiring unit 80, managing unit 85, searching unit 100, data converting unit 110, statistical data producing unit 130, clock unit 140, and/or CPU 150.

Further, forensic system 1 may include a keyboard, a mouse or a data input device such as a touch panel, if display unit 40 has a touch panel function. The data input devices may include specific-individual selecting unit 50, additional information setting unit 70, and keyword selecting unit 90.

Further, forensic system 1 may include a keyboard, a mouse or other suitable data input device (not shown). Alternatively or in addition, the display unit 40 can include a touch panel having a touch panel function. The data input device may include or be connected to the specific-individual selecting unit 50, additional information setting unit 70, and/or keyword selecting unit 90. The specific individual-selecting unit 50, additional information setting unit 70, and keyword selecting unit 90 may be separate data input devices, or alternatively, a sole or combined data input device. Further, the output unit 120 may be, for example, a recording device for recording data in an electronic medium or on other physical media such as paper via a printer.

The forensic system 1 shown in FIG. 1 may execute a forensic program stored in an external storage device (not shown) on CPU 150 of the computer. The forensic program may be stored in a recording medium such as CD-ROM, or distributed via a network such as the Internet, and/or may be installed in one or more of the PCs or the server 10.

In the first embodiment described below, the forensic system 1 can be a personal computer or associated with a personal computer. The forensic system 1 may be a server or a portable data assistance type of computer device. In another embodiment, the forensic system 1 may be a system configuration of a network type.

The digital information acquiring unit 20 may acquire digital information recorded in computers PC2 to PC5 or server 10 used by one or more users. For example, the digital information acquiring unit 20 may copy digital information 25 recorded in computers PC2 to PC5 or server 10 to an electronic medium such as USB, CD, or DVD. The unit 20 may further copy the digital information 25 to the forensic system 1 via the electronic medium.

The digital information acquiring unit 20 may preserve or otherwise collect the recorded digital information in computers PC2 to PC5 or serer 10 via network in the case where the forensic system 1 and computers PC2 to PC5 or server 10 are connected to the network.

The digital information acquiring unit 20 may collect recorded second digital information including second digital document information, second user information and second access history information in a second server different from the server 10.

In this case, the forensic system 1 may extract second digital information and the digital information from server 10. The forensic system 1 may extract second digital document information using the second access history information recorded in the second server.

The forensic system 1 may further include a text information extracting unit 80, which may extract text information from each of a plurality of document files 27. The forensic system 1 may further include a keyword selecting unit 90, which may select a keyword, and searching unit 100, which may search a document file 27 including the selected keyword based on the extracted text information from the recorded digital document information.

The additional information setting unit 70 may set additional information to the document file searched by the searching unit 100.

The forensic system 1 may further include a data converting unit 110. The unit 110 may convert and normalize digital documents, of digital document information recorded by unit 30, to a common format. The document file that is converted by the data converting unit 110 may be processed without further converting until being outputted from the output unit 120.

The forensic system 1 may further include a statistical data producing unit 130. The unit 130 may produce statistical data represented by or otherwise based on data size for each data format of the acquired digital document information, and/or statistical data represented by or otherwise based on data size for each data format of the digital document information searched by the searching unit 100.

The forensic system 1 may include a clock unit 140 to determine time and/or date when the digital information is acquired. The digital information may include folder information or other hierarchy information indicating where the digital document information is stored. The digital information acquiring unit 20 may acquire only the digital document information and folder information, which were produced after a time and date previously clocked by clock unit 140. The unit 20 may acquire only user information and access history information related with the acquired digital document information and/or folder information.

The digital information may include the digital document information, the user information, the access history information, and/or the folder information. The clock unit 140 may calculate a time and/or date of the digital information, which has been acquired by the digital information acquiring unit 20. The display unit 40 may display content according to an instruction of the display control unit 45 included in the control unit 160.

The digital information acquiring unit 20 may selectively acquire, from computers PC2 to PC5 or server 10, digital document information and folder information produced in a period from the $(n-1)^{th}$ to $n^{th}$ (e.g., n-2,3, . . . ) acquiring point. The digital information acquiring unit 20 may further acquire the user information and access history information related with the acquired digital document information and the folder information. The server 10 may include at least one server. For example, the server 10 may include a plurality of servers. Moreover, the server 10 may include at least two or more of a mail server, a file server, and a document management server.

The forensic system 1 may be used simultaneously by different operators. The additional information setting unit 70 may include a plurality of data input devices. The plurality of display units 40 may correspond in number to the plurality of additional information setting units 70. A plurality of operators may set additional information through the plurality of additional information setting units 70 while simultaneously evaluating digital document information.

The output unit 120 may output digital document information. For example, the output unit 120 may be a printer or other suitable recording device, which records digital information on an electronic medium.

Figure 2:
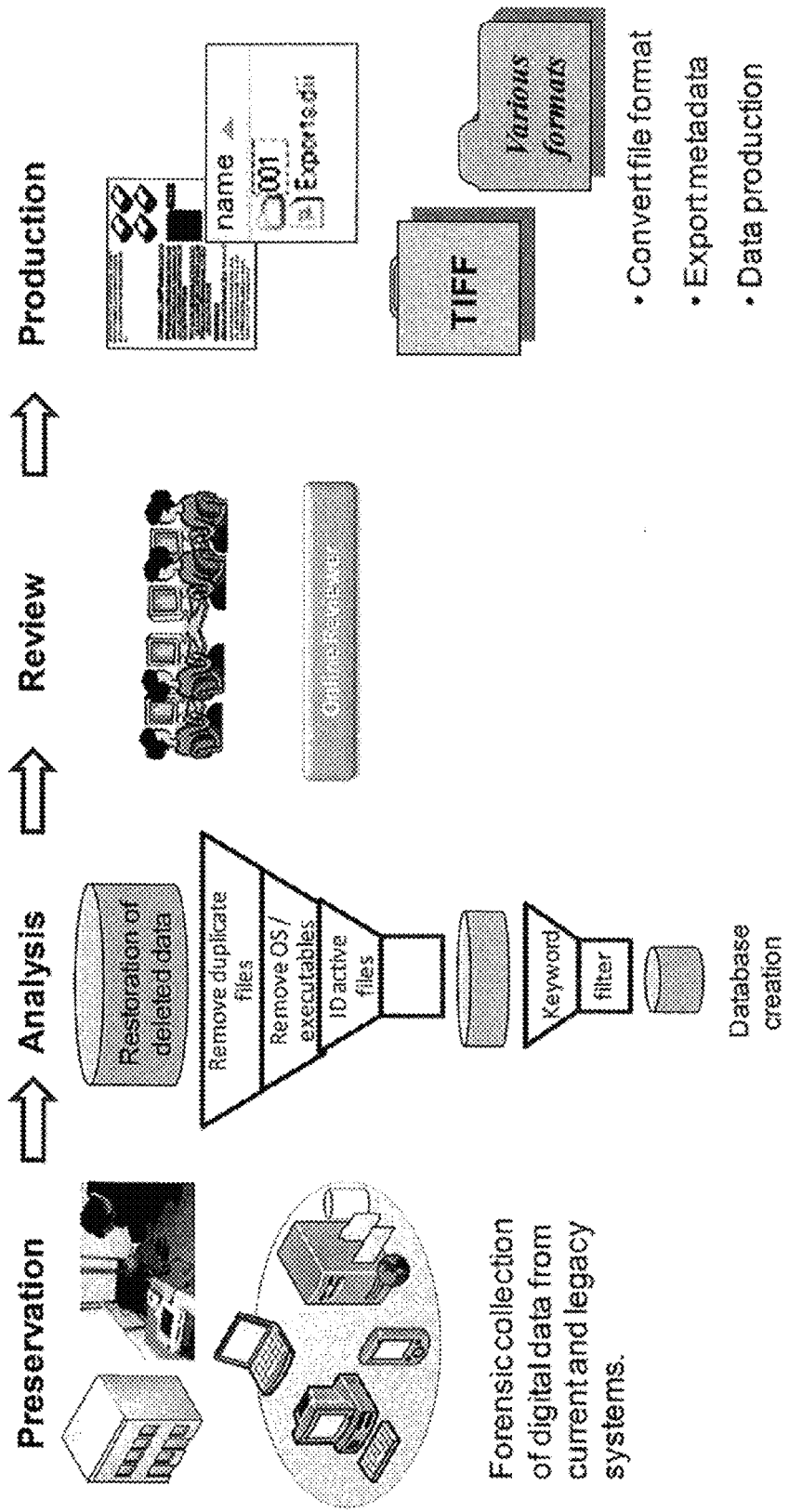
FIG. 2 is a diagram showing a flow of a forensic system service of the inventive concept.

FIG. 2 illustrates a service flow to explain a procedure for performing preparatory work for submission of evidentiary materials to a court of law using the forensic system 1. Reference is now made to the various elements of FIGS. 1 and 2.

When a crime or a legal conflict relating to a computer such as unauthorized access or leakage of confidential information or other so-called "forensic" events occur, it is necessary to collect and analyze devices, data, and/or electronic records, which are needed for investigation into the causes or to otherwise clarify legal evidences thereof. For example, pertaining to civil litigation in the United States of America, since such a procedure as eDiscovery is required, both a plaintiff and a defendant involved in the litigation must submit all of related digital information as evidences. They also need to submit digital information recorded in computer(s) and/or server(s) as evidences.

The forensic system 1 may be used to preserve the digital information recorded in the computers, for example PC2 to PC5 and server 10, in order to evaluate digital information related with the litigation, thereby conducting preparatory work to submit evidentiary materials to court of law. Thereafter, the forensic system 1 may register the preserved digital information in a database such as recording unit 30, and analyze the digital information to classify the same based on the keyword searching or filtering. The recording unit 30 may be included in one of the computers and/or servers connected to or otherwise included in or associated with the forensic system 1.

The forensic system 1 may provide the classified digital information on the display unit 40. Moreover, the operator(s) may review the data and set additional information to the digital document information via the additional information setting unit 70.

The control unit 160 may include preservation and analysis functions, processing functions, analysis functions, search function, operators' reviewing functions, and/or producing functions. For example, the preservation and analysis function of the control unit 160 may include a case management function (i.e., a function of managing unit 85), which allows data management for each case. In addition, the control unit 160 may include a file analysis function (i.e., a function of searching function 100), which allows analysis of the kind of file and/or a possession amount thereof for each target individual and/or evidentiary material. In addition, the control unit 160 may cause an analysis of a file to be performed or searched. Also, the control unit 160 may cause a file kind selection and/or extraction function to be performed (i.e., a function of the digital document information extracting unit 60), which allows selection of file type to be searched/browsed. Additionally, the control unit 160 may cause a preservation function to be performed (i.e., a function of the data converting unit 110), which allows preservation of the selected file as a separate file.

Further, the processing analysis and search function of control unit 160 may have a full-text search function and a frequently-appearing word and phase top-extraction function (i.e., functions of the searching unit 100). The full-text search function may be compatible with multi-language, allows AND, OR, and NOT searches by Boolean operation, and/or a grouping search. In addition, the full-text search function may have a highlight display function of a searched word or phrase and/or a conversion function to meta data. Further, the full-text search function may have an advanced search function such as neighborhood search. The frequently-appearing word and phase top-extraction function is for extracting a frequently-appearing word or phrase within certain digital document information.

The review function of the control unit 160 may include, for example, an e-mail family browsing processing function (i.e., a function of searching unit 100), which allows collective browsing of an e-mail family. In addition, the control unit 160 may include a free-design tag function (i.e., a function of searching unit 100), which allows search for material provided with one evaluation or a plurality of evaluations as additional information based on the evaluation(s). Further, the control unit 160 may include a free-design book-mark function (i.e., a function of searching unit 100), which allows book-mark search for material set with a hierarchy structure book-mark. Also, the control unit 160 may include a free-input comment column (i.e., a function of the managing unit 85) including a comment column in which any number of characters can be inputted. In addition, the control unit 160 may include a simultaneous browsing function for the above-described plurality of operators to evaluate digital document information. Further, the control unit 160 may include an access right control function (i.e., a function of the managing unit 85), which allows setting of such rights as an access right, manager right, or browsing-only right, or the like, for each case, for each account of a browser when performing review. Moreover, the control unit 160 may include a writing-within-document memo function (i.e., a function of the managing unit 85), which allows writing within a document without changing the text of the digital document information. In addition, the control unit 160 may include a case management function (i.e., a function of the managing unit 85), which allows display of the number of review-completed documents (e.g., in terms of a percentage).

The control unit 160 may also include an e-mail threading function (i.e., a function of the managing unit 85), which displays e-mail threads (such as returning, forwarding, and the like) collectively. Furthermore, the control unit 160 may include a mail analysis display function (i.e., a function of statistical data producing unit 130), which displays transmissions and receptions of mails graphically. In addition, the control unit 160 may include a similar document display function (i.e., a function of the managing unit 85), which performs automatic classification of similar documents such as draft or old-version documents, and may cause the documents to be displayed. Further, the control unit 160 may include a similar document difference highlight function (i.e., a function of the managing unit 85), which highlight-displays only a portion of a difference between similar documents. Also, the control unit 160 may include a previous and next texts-search hit portion display function (i.e., a function of the searching unit 100), which displays only the surrounding area of a word or a phrase hit by searching.

The production function of the control unit 160 may include various output functions. The output functions can be performed by the output unit 120 according to an instruction from managing unit 85. The output can be an XML output of such information including, for example, an actual file, meta information, tag information, comma-separated value (CSV) information, and/or various other suitable load file outputs. Additional functions can include a batch printing function (i.e., a function where output can be performed by the output unit 120 according to an instruction from the managing unit 85), which prints the selected digital document information.

The forensic system 1 may produce acquired data in an electronic medium using the output unit 120. For example, the forensic system 1 may record data in an electronic medium with a common data format by a recording device.

Figure 3:
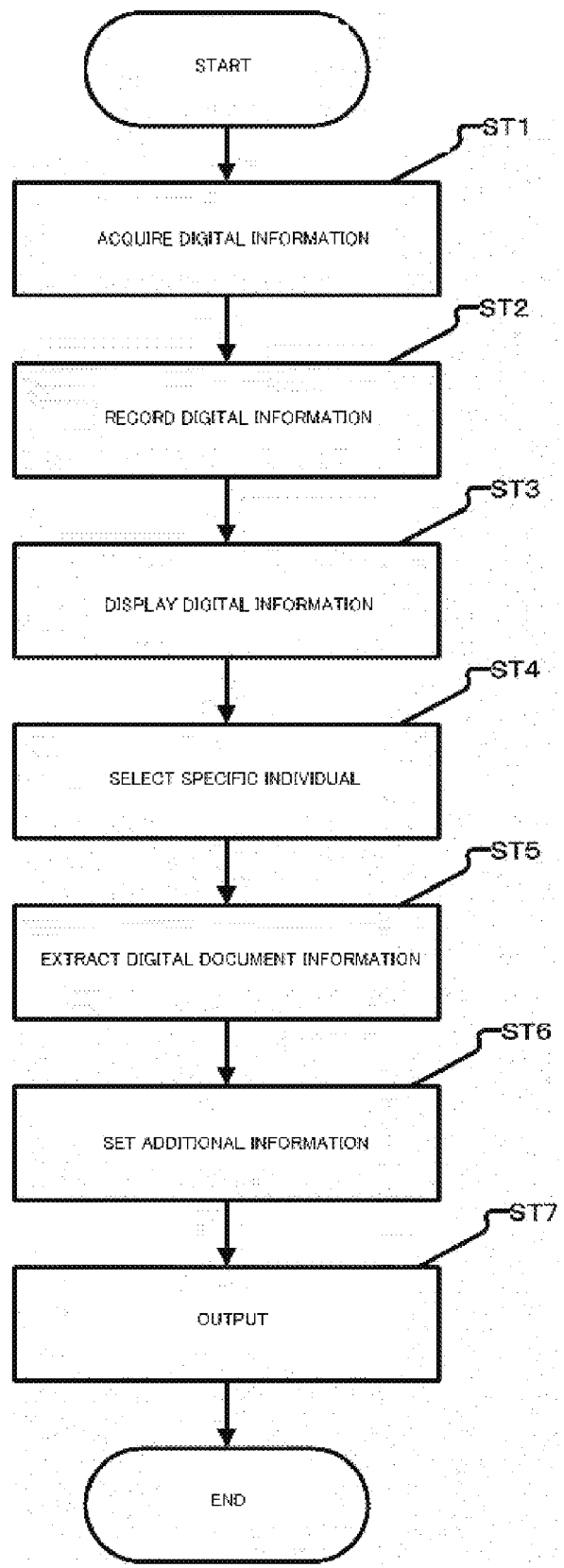
FIG. 3 is a flow chart showing a present forensic process of the forensic system of the inventive concept.

A procedure for performing preparatory work for submission of evidentiary materials to a court of law using the forensic system 1 will be described in detail with reference to the flowchart shown in FIG. 3.

The digital information acquiring unit 20 may acquire digital information 25 including digital document information 27 in a common format such as Word® format, PDF format, PPT format, and/or Excel® format, may acquire user information 29 about users who used the computers PC2 to PC5 or server 10, and may also acquire access history information 28 indicating the user and above-mentioned digital document information recorded in the server 10 (ST1).

The access history information 28 indicates a fact that the user who used computers PC2 to PC5 accessed the digital document information 27 recorded in the server 10 via network. For example, the access history information 28 may include a user ID indicating who a user is, which digital document information the user accessed, and/or when the user accessed the digital document information.

Explanation is made assuming that the number of computers (e.g., PC2 to PC5), which users utilized is four. However, it will be understood that the number of PCs is not limited to four, and any suitable number of computers can be used. The digital information acquiring unit 20 may record the acquired digital information to recording unit 30 (ST2). The display unit 40 can display the digital information (e.g., the digital document information, the access history information, the user information, and/or information showing only title of the digital information) via the control unit 160 (ST3). For example, according to an instruction from the display control unit 45, the display unit 40 may display all of the user information, the digital document information, and/or the access history information. In addition, the display unit 40 may display attribute information (e.g., a name of a user, a file name of a document file, an individual who conducted access, an access time, and/or a document file).

By way of another example, using a confirming a screen of the display unit 40, the operator(s) may login to the forensic system 1 and further produce a case, which is a unit of the uppermost data group in the database of the forensic system 1. Further, while using the confirming screen of the display unit 40, the operator(s) may set a connection destination of a server corresponding to the recording unit 30 in which the digital information has been recorded. The operator(s) may further manage the association between the server and the recording unit 30. In some embodiments, a plurality of recording units 30 are present.

Further, while using the confirming screen of the display unit 40, the operator(s) may set a custodian (i.e., a data-holding target individual or a user) and management thereof. In addition, while using the confirming screen of the display unit 40, the operator(s) may produce target digital document information (i.e., a middle data group unit in the database of the forensic system 1), or target information-collected and preserved, and may control the status thereof. While using the confirming screen of the display unit 40, the operator(s) may make a connection of the custodian to the target information-collected and preserved. For example, while using the confirming screen of the display unit 40, the operator(s) may preset which custodian was related with the litigation to a plurality of targets composed of the digital document information acquired from the computers PC2 to PC5 or server 10. While using the confirming screen of the display unit 40, the operator(s) can select one or a plurality of targets to be analyzed. Thus, the control unit 160 can acquire the digital information recoded in the recording unit 30 to analyze the digital information by the various functional units.

The forensic system 1 may include the statistical data producing unit 130, which produces statistical data represented by or otherwise based on data size for each data format of the digital document information recorded in recording unit 30, or statistical data represented by or otherwise based on data size for each data format of the digital document information searched by searching unit 100.

For example, while using the confirming screen of the display unit 40, the operator(s) can select a custodian to be analyzed and a predetermined path (e.g., directory) from a target corresponding to the custodian to display a list of an analysis result of the number of files and a size for each custodian. Further, while using the confirming screen of the display unit 40, the operator(s) can display the list of the analysis result of the number of files and a size for each path (e.g., directory) as a chart. Further, while using the confirming screen of the display unit 40, the operator(s) can display the analysis result of the number of files and a size for each path (e.g., directory) as a list. Further, while using the confirming screen of the display unit 40, the operator(s) can display the list of the analysis result of the number of files and a size for each file type as a chart. Further, while using the confirming screen of the display unit 40, the operator(s) can display the list of the analysis result of the number of files and a size for each file type.

Moreover, while using the confirming screen of the display unit 40, the operator(s) can display the list of the analysis result of the number of files and a size for each file type as a chart. Further, while using the confirming screen of the display unit 40, the operator(s) can display the list of the analysis result of the number of files and a size for each file type of only a text-searchable file as a chart. The text-searchable file is a file where text information can be preliminarily extracted from the digital document information recorded in the recording unit 30 by the text information acquiring unit 80.

Next, the operator(s) can select a specific individual (e.g., custodian) from users contained in the user information of the digital information recorded in the recording unit 30 using the specific-individual selecting unit 50 (ST4). While using the confirming screen of the display unit 40, the operator(s) can select a case, custodian, and/or target.

When the operator(s) review or otherwise evaluate the digital document information where an access right has been set to a custodian, if the individual's rank is higher within an organization, the access right can be set broader, so that numerous electronic documents, which are not related with the litigation and which were not actually browsed by the individual, are eventually collected. In such case, a problem can occur where significant labor and cost are needed to perform the analysis in order to find only documents related with the individual from an enormous amount of collected information.

To avoid such a problem, the digital document information extracting unit 60 can also extract only the digital document information which was accessed by the selected specific individual (e.g., custodian) based on the access history information related with the selected specific individual (ST5).

For example, when the operator(s) select Mr. Koh (e.g., personal name of a custodian), only the document file which was accessed by Mr. Koh is extracted within the digital document information within the selected target. By using the access history information, the operator(s) can extract the document file (e.g., browsed, edited, or produced), which was actually accessed by Mr. Koh. The access history information shows a fact that a user, which used either of a plurality of computers, accessed the digital document information recorded in the server. For example, the access history information may include a user ID showing who the user is, and the access history information may include access information showing which digital document information the user accessed and when the user accessed the digital document information. Since the ID information at Mr. Koh's utilization time of the computer or the server, and the access history information about Mr. Koh, are preliminarily recorded in recording unit 30, the operator(s) can extract the digital document file which was accessed by Mr. Koh by taking a correspondence relationship between Mr. Koh's ID and the document file which was accessed by Mr. Koh.

The example of Mr. Koh has been described, but when a plurality of custodians such as Mr. Otsu (e.g., personal name of another custodian) in addition to Mr. Koh are selected, the digital document information extracting unit 60 can extract a document file related with the plurality of custodians.

As described above, when the operator(s) have set a relationship between the target and the custodian, only a document file which was accessed by the custodian who was actually selected by specific-individual selecting unit 50 within the target which was determined to be related and selected as the custodian at the target unit is consistently extracted.

Moreover, the operator(s) can search according to the function of searching unit 100, while using the confirming screen of the display unit 40. Further, the display control unit 45 function allows the operator(s) to perform simple browsing, while using the confirming screen of the display unit 40. The simple browsing allows the operator(s) to grasp the contents of the digital document information quickly and efficiently.

The operator(s) may set additional information to the extracted document files in the digital document information to indicate whether or not each of the document files is related with the litigation (ST6). Specifically, the operator(s) may add a tag for each document file depending on its relationship with the litigation. The tag (e.g., additional information) may include "hot" for a file related with the litigation, "responsive" for one which may potentially be related with the litigation, and/or "not responsive" for one which is not related with the litigation. More specifically, the operator(s) may input a tag by clicking a file row in a batch list.

The operator(s) may use the output unit 120 to output the document file related with the litigation based on the additional information. For example, the operator(s) may output only a document file attached with "hot," or may output document files attached with "hot" and "responsive," among other possibilities and combinations. The output unit 120 may output a document file related with the litigation based on the additional information (ST7).

The forensic system 1 may include or otherwise be associated with a plurality of servers. The forensic system 1 may include digital information extracting unit and a searching unit. The digital information extracting unit and searching unit may be separated into the various servers to form the forensic system 1. The separated forensic systems may be connected via a network.

Figure 4:
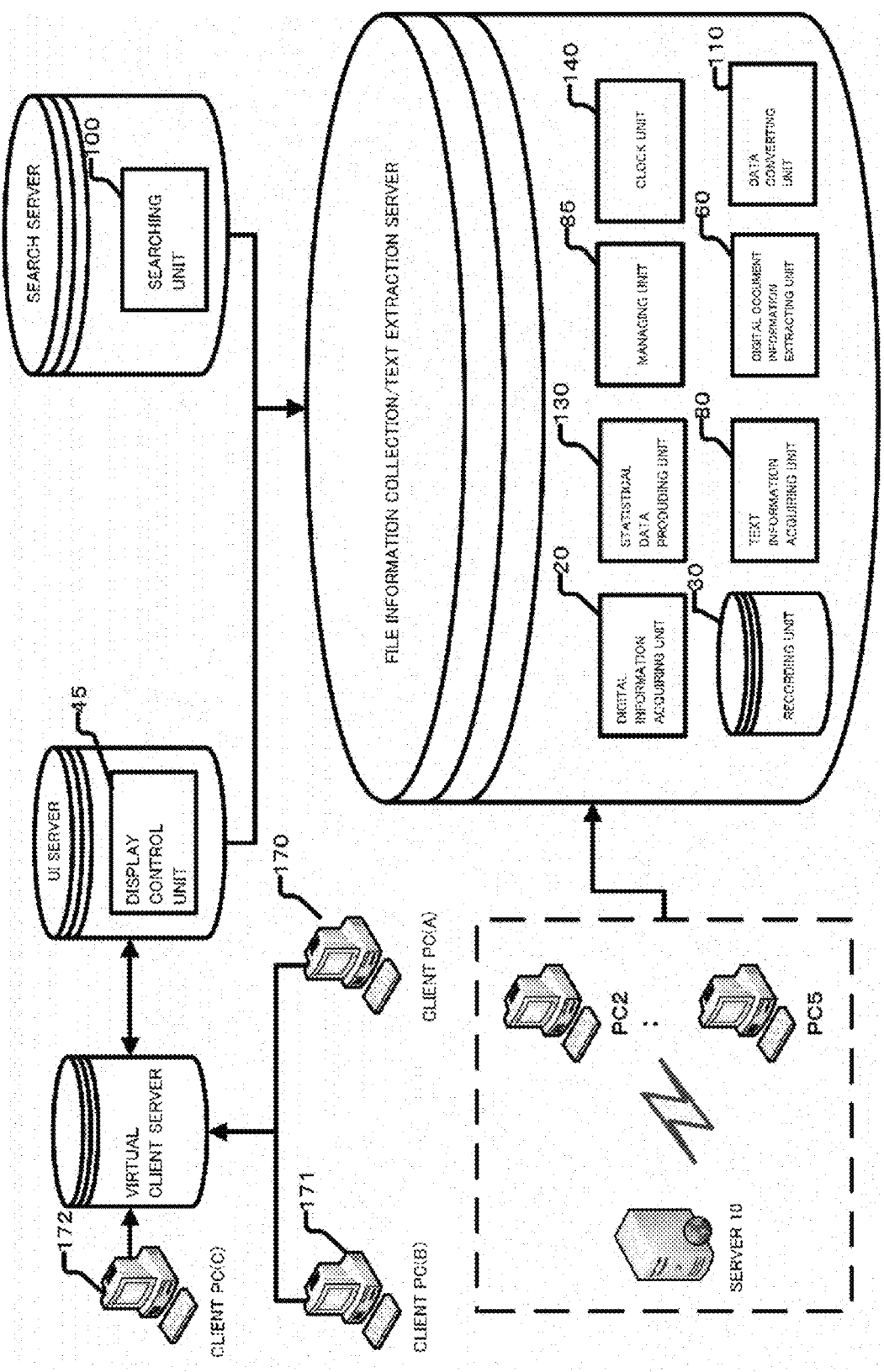
FIG. 4 is a block diagram showing a forensic system in a second embodiment of the inventive concept.

By way of another example, a second embodiment will be described with reference to FIG. 4. The forensic system 1 may have a system configuration of a network type as shown in FIG. 4. The second embodiment of the inventive concept of the forensic system 1 may include processing units similar to those of the forensic system 1 explained in the first embodiment of the inventive concept. The processing units are located separately in a plurality of servers. The servers are connected to each other via a network. Therefore, the servers may be located within the country, and the servers may be located in a distributed manner regardless of home and/or abroad.

The display units 40 may be provided on clients PC170 to PC172. The display response of the display units 40 can be improved by collecting data transmissions and receptions in a virtual client/server in a bundle between a plurality of clients (e.g., PCs) and a user interface (UI) server.

Thus, the forensic system 1 may be configured by the computer in a similar fashion as the first embodiment, or alternatively, the forensic system 1 may be configured by the system of the network type similar to the second embodiment.

According to the forensic system 1, the specific-individual selecting unit 50, additional information setting unit 70, and/or keyword setting unit 90 can correspond to the data input device provided in each of clients PC 170 to PC 172.

By selecting a specific individual, sorting only digital document information which was accessed by the specific individual based on the access history information about the selected specific individual, extracting the sorted digital document information, setting additional information indicating whether or not the document files in the extracted digital document information are each related with the litigation, and outputting the document file related with the litigation based on the additional information, the forensic system 1 makes it possible to extract and analyze only the digital document information which was accessed by the specific individual without evaluating all of the digital document information within the range of the access right possessed by the specific individual, when the individual is involved in the litigation.

Accordingly, the operator(s) can extract only the digital document information related with the specific individual among the flood of digital document information, thereby achieving a work load reduction for evidentiary material preparation in connection with the litigation.

The forensic system 1 can use the second digital information recorded in the second server, and when extracting the second digital document information based on the second access history information, the forensic system 1 may extract, analyze and evaluate only some of the digital document information recorded in the second server, which was accessed by the specific individual without evaluating all of the digital information recorded in the plurality of servers.

According to the forensic system 1, the text information extracting unit 80 and searching unit 100 are provided, and when the additional information setting unit 70 sets additional information to the searched document file, the operators can narrow down only some of the digital document information recorded in the server which was accessed by the specific individual, and a population of the digital document information, which is potentially related with the litigation, using a predetermining search.

According to the forensic system 1, when the document file converted by the data converting unit 110 is processed with the same data format as the converted data format in a period before it is outputted by the output unit 120, the operator(s) can reduce a wasteful step such as data format conversion in the course of the processing flow, and they can exclude a risk of quality degradation of the digital document information.

According to the forensic system 1, when the statistical data producing unit 130 is further provided, statistical data can be visualized and provided to the operator(s), so that labor required for litigation preparation can be grasped early and efficiently.

Further, according to the forensic system, method, and program of the inventive concept, when the digital information acquiring unit 20 acquires only the digital document information and folder information, which were produced after the time and date previously clocked by the clock unit, and acquires only the user information and the access history information related with the acquired digital document information and the folder information, the operator(s) can perform a difference collection of the digital information, which can reduce the load for acquiring the same digital information from such a device as the server redundantly each time. According to the forensic system 1, when the digital information extracting unit 60 and searching unit 100 are separated into different servers of the forensic system, respectively, a processing capacity of the whole system can be improved by distributing calculation steps of respective processing units to the respective servers.

According to the forensic system 1, when simultaneous utilization by a plurality of operators is possible, the additional information setting unit 70 allows different operators to set additional information, so that the operators can perform a preparatory work at an early stage by a plurality of individuals making a determination about whether or not digital document information is evidentiary material to a court of law.

The embodiments of the inventive concept have been described above, but the technical scope of the inventive concept is not limited to the scope described in the above-described embodiments. It is apparent that various modifications or improvements can be applied to the above-described embodiments. It is apparent from the description of the scope of claims that an aspect which has been applied with such a modification or improvement can also be included in the technical scope of the inventive concept.

Further, forensic systems 1 of the first embodiment and the second embodiment may be configured by combining the respective whole systems or respective processing units of the respective forensic systems 1.

The invention claimed is:

1. A forensic system configured to acquire digital information recorded on a plurality of computers or a server to analyze the acquired digital information, the forensic system comprising:

a digital information acquiring unit configured to acquire digital information containing digital document information composed of a plurality of document files, to acquire user information about users using the plurality of computers or the server, and to acquire access history information which shows a fact that the users accessed a document file recorded in the server;

a recording unit configured to record therein digital information acquired by the digital information acquiring unit;

a first display unit usable by a first operator configured to display the recorded digital information;

a second display unit usable by a second operator configured to display the recorded digital information;

a specific-individual selecting unit configured to select, via at least one of the first display unit or the second display unit, a specific first individual and a specific second individual from the users contained in the user information, wherein the first operator, the second operator, the specific first individual, and the specific second individual are different from each other;

a control unit including:
  a digital document information extracting unit operable on a first server and configured to extract only digital document information which was accessed by the specific first individual and the specific second individual based on the access history information related with the selected specific first individual and the selected specific second individual;
  a file analysis function configured to analyze a kind of document file which was accessed or possessed by the specific first individual and the specific second individual;
  a kind selection function configured to cause the extraction unit to extract a particular kind of document file;
  a preservation function configured to preserve the extracted document file as a separate file and to control the status thereof; and
  a clock unit which, when newly acquiring digital information, is configured to clock a time and date of the acquisition of the digital information, the digital information further including folder information saving digital document information, wherein the digital information acquiring unit is configured to acquire the digital document information and the folder information which were produced after a time and date previously clocked by the clock unit, and wherein the digital information acquiring unit is configured to acquire user information and access history information related with the acquired digital document information and the folder information;

a first additional information setting unit usable by the first operator and a second additional information setting unit usable by the second operator configured to simultaneously set, via the first display unit and the second display unit, respectively, additional information indicating which document files in the extracted digital document information are each related with litigation, and which document files in the extracted digital document information are each not related with litigation;

the control unit further including:
  a multi-language full-text searching unit operable on a second server and configured to perform a multi-language full-text search of the document files based on the extracted digital document information; and
  a managing unit including an access right control function configured to set one or more rights for each account of a browser; and an output unit configured to output a document file related with the litigation based on the additional information.

2. The forensic system according to claim 1, wherein
the digital information acquiring unit is configured to acquire second digital information including second digital document information, second user information and second access history information, the second digital information being recorded in a second server different from the server; and
the forensic system is configured to use not only the digital information but also the second digital information, and to extract the second digital document information based on the second access history information.

3. The forensic system according to claim 1, further comprising:
a text information extracting unit configured to extract text information for each of the plurality of document files from the recorded digital document information;
a keyword selecting unit configured to select a keyword; wherein:
the searching unit is configured to search a document file including the selected keyword based on the extracted text information, and
the first additional information setting unit and the second additional information setting unit are configured to set additional information to the searched document file.

4. The forensic system according to claim 1, further comprising:
a data converting unit configured to convert the document file in the digital document information recorded by the recording unit to a predetermined data format, wherein
the document file converted by the data converting unit is processed with the same data format as the converted data format in a period before being outputted by the output unit.

5. The forensic system according to claim 1, further comprising:
a statistical data producing unit configured to produce statistical data represented by data size for each data format of the acquired digital document information or statistical data represented by data size for each data format of the searched digital document information.

6. The forensic system according to claim 1, wherein
the forensic system further includes a plurality of servers,
the digital information extracting unit and the searching unit are separate from the servers, respectively, and
the separate digital information extracting unit, the searching unit, and the plurality of servers are connected to each other via a network.

7. The forensic system according to claim 1, wherein
the output unit is either one of a printer and a digital document producing device.

8. A forensic method for acquiring digital information recorded on a plurality of computers or a server to analyze the acquired digital information, the method comprising:
acquiring digital information containing digital document information composed of a plurality of document files, acquiring user information about users using the plurality of computers or the server, and acquiring access history information which shows a fact that the users accessed a document file recorded in the server;
recording the acquired digital information;
displaying, on a first display unit usable by a first operator, the recorded digital information;

displaying, on a second display unit usable by a second operator, the recorded digital information;

selecting, via at least one of the first display unit or the second display unit, a specific first individual and a specific second individual from the users contained in the user information, wherein the first operator, the second operator, the specific first individual, and the specific second individual are different from each other;

extracting, by an extracting unit operable on a first server, only digital document information which was accessed by the specific first individual and the specific second individual based on the access history information related with the selected specific first individual and the selected specific second individual;

analyzing, by a file analysis function, a kind of document file which was accessed or possessed by the specific first individual and the specific second individual;

causing the extraction unit, by a kind selection function, to extract a particular kind of document file;

preserving, by a preservation function, the extracted document file as a separate file and controlling the status thereof;

when newly acquiring digital information, clocking by a clock unit a time and date of the acquisition of the digital information, the digital information further including folder information saving digital document information;

acquiring, by the digital information acquiring unit, the digital document information and the folder information which were produced after a time and date previously clocked by the clock unit, and acquiring user information and access history information related with the acquired digital document information and the folder information;

simultaneously setting additional information, by a first additional information setting unit usable by the first operator via the first display unit and a second additional information setting unit usable by the second operator via the second display unit, indicating which document files in the extracted digital document information are each related with litigation, and which document files in the extracted digital document information are each not related with litigation;

searching, by a multi-language full-text searching unit operable on a second server, the full-text of the document files based on the extracted digital document information;

setting, by an access right control function of a managing unit, one or more rights for each account of a browser; and outputting a document file related with the litigation based on the additional information.

9. A non-transitory recording medium recording therein a forensic program which acquires digital information recorded on a plurality of computers or a server to analyze the acquired digital information, for causing a computer to execute:

a function of acquiring digital information containing digital document information composed of a plurality of document files, acquiring user information about users using the plurality of computers or the server, and acquiring access history information which shows a fact that the users accessed a document file recorded in the server;

a function of recording the acquired digital information;

a function of displaying, on a first display unit usable by a first operator, the recorded digital information;

a function of displaying, on a second display unit usable by a second operator, the recorded digital information;

a function of selecting, via at least one of the first display unit or the second display unit, a specific first individual and a specific second individual from the users contained in the user information, wherein the first operator, the second operator, the specific first individual, and the specific second individual are different from each other;

a function of extracting, by an extracting unit operable on a first server, only digital document information which was accessed by the specific first individual and the specific second individual based on the access history information related with the selected specific first individual and the selected specific second individual;

a function of analyzing, by a file analysis function, a kind of document file which was accessed or possessed by the specific first individual and the specific second individual;

a function of causing the extraction unit, by a kind selection function, to extract a particular kind of document file;

a function of preserving, by a preservation function, the extracted document file as a separate file and a function of controlling the status thereof;

when newly acquiring digital information, a function of clocking by a clock unit a time and date of the acquisition of the digital information, the digital information further including folder information saving digital document information;

a function of acquiring, by the digital information acquiring unit, the digital document information and the folder information which were produced after a time and date previously clocked by the clock unit, and a function of acquiring user information and access history information related with the acquired digital document information and the folder information;

a function of simultaneously setting additional information, by a first additional information setting unit usable by the first operator via the first display unit and a second additional information setting unit usable by the second operator via the second display unit, indicating which document files in the extracted digital document information are each related with litigation, and which document files in the extracted digital document information are each not related with litigation;

a function of searching, by a multi-language full-text searching unit operable on a second server, the full-text of the document files based on the extracted digital document information;

a function of setting, by an access right control function of a managing unit, one or more rights for each account of a browser; and a function of outputting a document file related with the litigation based on the additional information.

10. The forensic system according to claim 1, wherein the access right control function of the managing unit is configured to set a browser-only right.

11. The forensic system according to claim 1, wherein the access right control function of the managing unit is configured to set a manager right.

12. The forensic system according to claim 1, wherein the access right control function of the managing unit is configured to set an access right.

13. The method of claim 8, wherein setting further includes setting a browser-only right.

14. The method of claim 8, wherein setting further includes setting a manager right.

15. The method of claim 8, wherein setting further includes setting an access right.

16. The non-transitory recording medium of claim 9, wherein the function of setting further includes a function of setting a browser-only right.

17. The non-transitory recording medium of claim 9, wherein the function of setting further includes a function of setting a manager right.

18. The non-transitory recording medium of claim 9, wherein the function of setting further includes a function of setting an access right.

* * * * *